US008954765B2

(12) United States Patent
Brown et al.

(10) Patent No.: US 8,954,765 B2
(45) Date of Patent: *Feb. 10, 2015

(54) ENERGY BASED RESOURCE ALLOCATION ACROSS VIRTUALIZED MACHINES AND DATA CENTERS

(75) Inventors: Alexander B. Brown, West Kirby (GB); Neil A. Campbell, Manchester (GB); Ryan J. Cocks, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/621,223

(22) Filed: Sep. 15, 2012

(65) Prior Publication Data

US 2013/0047006 A1    Feb. 21, 2013

Related U.S. Application Data

(63) Continuation of application No. 13/212,027, filed on Aug. 17, 2011.

(51) Int. Cl.
*G06F 1/00* (2006.01)
*G06F 1/32* (2006.01)
*H04L 12/64* (2006.01)

(52) U.S. Cl.
CPC ............ *G06F 1/3234* (2013.01); *G06F 1/3287* (2013.01); *H04L 12/6418* (2013.01)
USPC .......................................................... 713/300

(58) Field of Classification Search
CPC .......................................................... G06F 1/26
USPC .......................................................... 713/300
See application file for complete search history.

(56) References Cited

U.S. PATENT DOCUMENTS

| 2007/0260897 A1* | 11/2007 | Cochran et al. ............... 713/300 |
| 2010/0088707 A1* | 4/2010 | Corn et al. ................... 718/104 |
| 2011/0004500 A1* | 1/2011 | Nathuji ............................. 705/7 |
| 2011/0239010 A1* | 9/2011 | Jain et al. ...................... 713/310 |

* cited by examiner

*Primary Examiner* — Mohammed Rehman
*Assistant Examiner* — Alyaa T Mazyad
(74) *Attorney, Agent, or Firm* — Yudell Isidore PLLC; Matthew Talpis

(57) ABSTRACT

A method allocates energy entitlement to a logical partition (LPAR) executing on a data processing system. An energy entitlement allocation (EEA) utility enables an administrator to specify a minimum and/or maximum energy entitlement and an LPAR priority. When the relevant LPARs utilize the respective minimum energy entitlement based on a respective energy consumption, the EEA utility determines whether the LPAR(s) has satisfied a respective maximum energy entitlement. When the LPAR has not satisfied its maximum energy entitlement, the EEA utility allocates unused energy entitlement from the data processing system to the LPAR, according to an allocation policy. Additionally, the EEA utility dynamically adjusts a priority level for the LPAR to efficiently control resource allocation, according to the LPAR's energy consumption relative to its energy entitlement. In addition, the EEA utility is able to transfer unused energy entitlement to other data processing systems requiring further allocation of energy entitlement.

7 Claims, 7 Drawing Sheets

ENERGY BASED RESOURCE ALLOCATION ACROSS VIRTUALIZED MACHINES AND DATA CENTERS

PRIORITY CLAIM

The present application is a continuation of and claims priority from U.S. patent application Ser. No. 13/212,027, filed on Aug. 17, 2011, titled "Energy Based Resource Allocation Across Virtualized Machines and Data Centers," which is incorporated by reference herein in its entirety and for all purposes.

BACKGROUND

1. Technical Field

The present invention relates in general to data processing systems and in particular to resource allocation within a data processing system. Still more particularly, the present invention relates to energy based resource allocation within a virtualized data processing system.

2. Description of the Related Art

In today's computer systems and data centers, specification of power consumption limits is becoming increasingly important. Specifying maximum energy consumption limits for a device is particularly important for several reasons: (1) There may be a maximum power supply to the building which houses a computer system executing critical applications; (2) the cooling capability of a data centre may only be sufficient to deal with a limited load; and (3) there may be a fixed budget for energy consumption based on financial cost, carbon emissions and other consumption based factors. If a consumption limit is to be employed on a single physical system in which multiple virtual machines/LPARs share resources, it is difficult to determine how to manage resources to keep power consumption within a specified consumption limit. Attempting to manage resources across multiple machines within a data center provides further difficulties.

Two existing approaches are the following: (1) A system is run at full power and is shut down immediately after the limit is reached; and (2) A system limits total energy usage and scales down the energy consumption gradually as the limit is approached. These existing approaches may result in energy resources being used by lower priority workloads at the expense of high priority workloads.

None of the existing alternatives allow any intelligent management of resources in light of an energy consumption limit. Intelligent management of resources may be especially important when multiple parties have a stake in the system. A data processing system that supports a cloud environment is a particular example of a system in which several different parties, groups or companies/stakeholders share physical resources.

BRIEF SUMMARY

Disclosed are a method for allocating energy entitlement to a logical partition (LPAR) executing on a data processing system. An energy entitlement allocation (EEA) utility enables an administrator to specify a minimum and/or maximum energy entitlement and a priority of the LPAR. When the LPAR and other relevant LPARs utilize the respective minimum energy entitlement based on a respective energy consumption, the EEA utility determines whether the LPAR (and other LPARs) has satisfied a respective maximum energy entitlement. When the LPAR has not satisfied its maximum energy entitlement, the EEA utility allocates unused energy entitlement from the data processing system to the LPAR, according to an allocation policy. Additionally, the EEA utility dynamically adjusts a priority level for the LPAR to efficiently control resource allocation, according to the LPAR's energy consumption relative to its energy entitlement. In addition, the EEA utility is able to transfer unused energy entitlement to other data processing systems requiring further allocation of energy entitlement.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1:
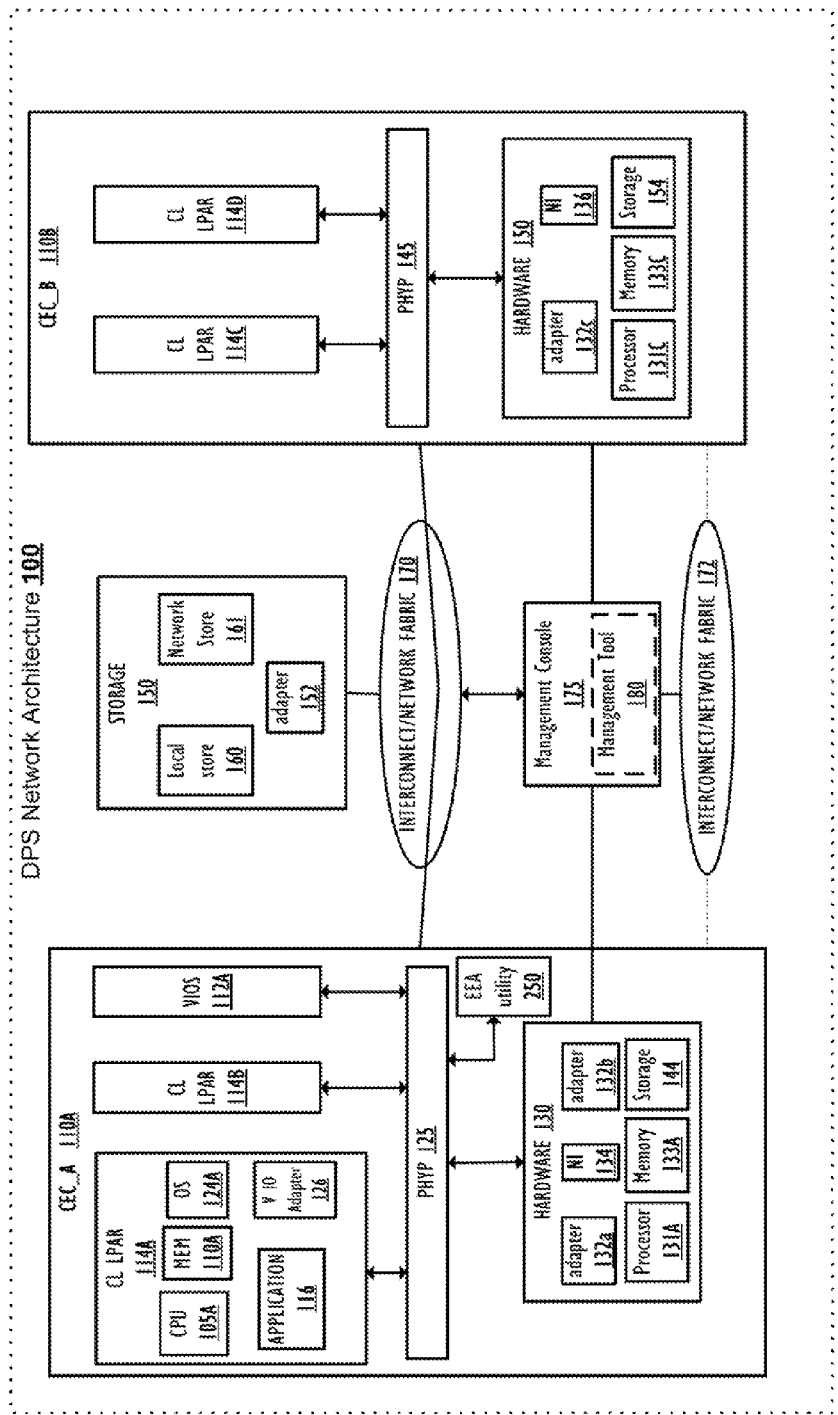
FIG. 1 illustrates a virtualized data processing system/network within which various of the functional features of the described embodiments are implemented, according to one embodiment.

The illustrative embodiments provide a method, data processing system, and computer program product for allocating energy entitlement to a logical partition (LPAR) executing on a data processing system. An energy entitlement allocation (EEA) utility enables an administrator to specify a minimum and/or maximum energy entitlement and a priority of the LPAR. When the LPAR and other relevant LPARs utilize the respective minimum energy entitlement based on a respective energy consumption, the EEA utility determines whether the LPAR (and other LPARs) has satisfied a respective maximum energy entitlement. When the LPAR has not satisfied its maximum energy entitlement, the EEA utility allocates unused energy entitlement from the data processing system to the LPAR, according to an allocation policy. Additionally, the EEA utility dynamically adjusts a priority level for the LPAR to efficiently control resource allocation, according to the LPAR's energy consumption relative to its energy entitlement. In addition, the EEA utility is able to transfer unused energy entitlement to other data processing systems requiring further allocation of energy entitlement.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a number of processing nodes arranged/configured as one or more computing electronic complexes. The illustrative and described embodiments assume that the system architecture may be scaled to a much larger number of processing nodes.

It is appreciated that the computing environment in which the described embodiments can be practice can be referred to as a cloud computing environment. Cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like a physical machine. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

With specific reference now to FIG. 1, there is depicted a block diagram of an example architecture (100) for a network of virtualized data processing systems (DPS), within which the functional aspects of the described embodiments may advantageously be implemented. For simplicity, the DPS network architecture (100) shall be referred to herein simply as DPS 100. DPS 100 comprises a plurality of computing nodes, each referred to herein as a computing electronic complex (CEC), of which CEC 110A (i.e., the primary host) and CEC 110B (i.e., the secondary host) are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). In one embodiment, each CEC 110A-110B comprises at least one Virtual Input/Output Server 112 (also referred to herein as a VIO Server or VIOS). Also supported within each CEC 110A-110B are client logical partitions (interchangeably referred to as client LPARs or "clients"), of which a first two clients, clientA 114a and clientB 114b, and client 114c and 114d, respectively, are illustrated. Client LPARS may also be interchangeably referred to as LPARS or virtual machines herein. As described below, with reference to FIG. 2, client LPARs 114 are logical partitions of a virtualized (or operating system partitioned) computing system. The actual number of clients/virtual machines within each CEC 110 may vary and could range from a single client/virtual machine to hundreds or thousands of clients/virtual machines, without limitation. For efficiency in presenting the inventive concepts herein, only two clients/virtual machines are presented within each CEC 110 of the various illustrative and described embodiments.

Figure 2:
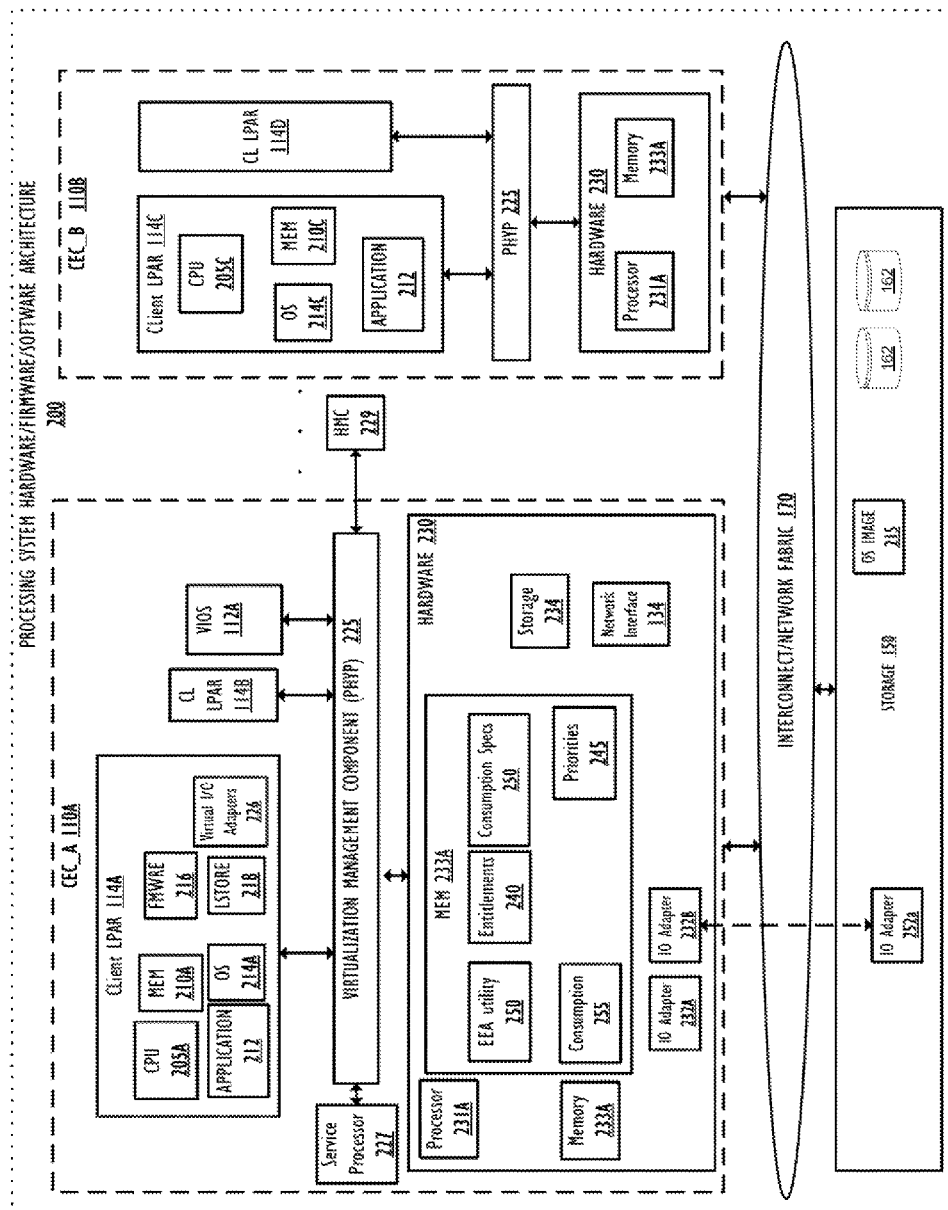
FIG. 2 illustrates an internal configuration of a computing electronic complex (CEC) having virtualized OS partitions, including logical partitions (LPARs), according to one embodiment.

DPS 100 also comprises a distributed (shared) storage facility, accessible to each of the CECs 110 and the components within the CECs 110. In one embodiment, CEC 110A (i.e., the primary host) and CEC 110B (i.e., the secondary host) can both access the distributed storage facility. In another embodiment, the primary host and the secondary host access separate/distinct storage facilities. Within the described embodiments, the distributed storage facility will be referred to as distributed data store 150, and the distributed data store 150 enables several of the client level functional features provided by the embodiments described herein. Distributed data store 150 is a distributed storage facility providing a single view of storage that is utilized by each CEC 110 and for each client 114 of each CEC 110 within a shared, distributed system. Distributed data store 150 comprises local physical storage 160 and network storage 161, both of which comprise multiple physical storage units 162 (e.g., disks. solid state drives, etc.) (FIG. 2). The physical disks making up distributed data store 150 may be distributed across a storage network (e.g., a SAN). Additionally, distributed data store 150 provides a depository within which is stored and maintained the software utility, instruction code, OS images, client images, data (system, node, and client level), and/or other functional information utilized in maintaining the client-level, system management, and storage-level operations/features of DPS 100.

Communication between each VIOS 112 of each CEC 110 as well as with the VIOSes of at least one other CEC 110 is supported within DPS 100. In one embodiment, DPS 100 comprises a management console 175 on which a management tool executes.

Each CEC 110 within DPS 100 connects to distributed storage 150 via one or more networks and/or I/O interconnect/switch fabric (generally illustrated as interconnect/network fabric 170). The descriptions and illustrations assume that at least some of the CECs 110 of DPS 100 and distributed storage 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage 150.

As depicted, each CEC 110 comprises one or more network interfaces 134 and one or more I/O adapters 132 to enable the CEC 110 and thus the other components (i.e., client partitions) of the CEC 110 to engage in network level communication. Internal CEC communication between client LPARs 114a-114c are routed through the virtualization management component. Hardware components 130 of example CEC 110A include one or more processors (e.g., 131A), one or more memories (e.g., 133A), and local storage 144. The processors are interconnected with one or a plurality of memories and with local storage 144 via a bus, interconnect/switch or an interconnect fabric (not specifically shown). Each LPAR, e.g., client LPAR 114A, receives an allocation of specific virtualized hardware and OS resources, including virtualized CPU 105A, Memory 110A and OS 114A. Application 116 executes on LPAR 114A. Each client LPAR 114 includes a respective host operating system 114 that controls low-level access to hardware layer (130) of CEC 110A and/or to virtualized I/O functions and/or services. In addition, energy entitlement allocation (EEA) utility 250 executes on CEC 110A and is communicatively connected to Power™ Hypervisor (PHYP) 125. In one embodiment, EEA utility 250 is integrated within PHYP 125. Management console 175 is utilized to perform the setup and/or initialization of the backup and restore operations described herein for the individual VIOSes 112/LPARs 114 and/or of the network as a whole, in various embodiments.

In another embodiment, DPS 100 is configured without any VIOSes. In one embodiment, a large number of (virtual) individual network adapters are represented by virtual adapters assigned to each LPAR/virtual machine. As a result, network resources may be assigned to a number of virtual machines (i.e., client logical partitions) running on the same host, allowing each virtual machine to communicate directly with the network hardware while still allowing sharing of the adapter between virtual machines. Furthermore, the (physical) network adapter is aware of the existence of different virtual machines/LPARS and the individual traffic originating from respective virtual machines.

With reference now to FIG. 2, there is presented another view of an example DPS 100, emphasizing a virtualized processing system architecture 200 (i.e., architecture of the individual CECs, and specifically CEC_A 110A). CEC_A 110A (CEC 110A) serves as the example CEC and, in particular, as the primary host that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231, one or more memories 233, and local storage 234. According to the presently described embodiments, first CEC 114A comprises MEM 233A which includes entitlements data 240, priorities data 245, consumption specifications 250, consumption data 255 and energy entitlement allocation (EEA) utility 250, which are all utilized in allocating energy entitlements to a logical partition (LPAR) executing on a data processing system (e.g., CEC 110A). The processors 231 are interconnected with one or a plurality of memories 233 and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232, which provides the I/O interface for CEC_A 110A. I/O adapters 232 are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters can then be uniquely assigned to different logical partitions. In one or more embodiments, configuration data related to the virtualized adapters and other components that are assigned to the LPARs are maintained within each LPAR and can be maintained and updated by the LPAR OS, as changes are made to such configurations and as adapters are added and/or removed and/or assigned.

Logically located above the hardware level (230) is a virtualization management component, provided as a Power Hypervisor (PHYP) 225 (trademark of International Business Machines (IBM) Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. HMC 229 is one possible implementation of the management console 175 illustrated by FIG. 1. The use of HMC 229 specifically within this illustration is solely for illustration of one actual embodiment among several available options. Operations of the different logical partitions can be controlled through HMC 229, which is a separate data processing system from which a system administrator may perform various functions, such as reallocation of resources to different logical partitions. Importantly, features related to backup and restoration of OS partitions and in particular of the VIOSes and the data processing network are controlled through the HMC, in the present embodiment.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services. In one embodiment, the operating system(s) may be implemented using IBM i (or other virtualization operating system), which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and IBM i is used only as an example.

Within CEC 110A, VIOSes 112 and client LPARs 114 utilize an internal virtual network to communicate. This communication is implemented by API calls to the memory of the PHYP 225. The client LPARs 114 are able to be connected and inter-operate fully in a VLAN environment.

Those of ordinary skill in the art will appreciate that the hardware, firmware/software utility, and software components and basic configuration thereof depicted in FIGS. 1 and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

The virtualized environment of DPS 100 allows sharing of physical I/O resources between client LPARs and virtual networking. In addition, the virtualized environment allows more efficient utilization of physical resources through sharing between client LPARs, and supports a single machine (e.g., CEC 110) to run multiple operating system (OS) images concurrently and isolated from each other.

In the illustrative embodiment, VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices.

Energy Based Resource Allocation

According to the presently described embodiments, an energy entitlement allocation (EEA) utility is provided on the CEC to enable support for energy based resource allocation across virtualized machines and data centers. EEA utility 250 executes within first CEC 110A (i.e., a primary host) having a first set of virtual machines/LPARs. In one embodiment, the EEA utility similarly executes in second CEC 110B (i.e., a secondary host) having a second set of virtual machines/LPARs. For example, during inter-CEC collaboration, the EEA utility executes on a first CEC (e.g., CEC 110A) and one or more other instances of the EEA utility respectively executes on one or more other CEC's (e.g., CEC 110B) that participate in inter-CEC collaboration by which (inter-CEC collaboration) the first CEC transfers/re-allocates unused/available energy entitlement to the second CEC and, in particular, to one or more LPARs executing on the second CEC. The EEA utility allocates energy entitlement to a logical partition (LPAR) executing on a data processing system/

CEC. An energy entitlement is an allowed/established/specified level of power consumption that is assigned to an LPAR. EEA utility 250/PHYP 225 determines an amount of system resources that the LPAR utilizes to attain a particular level of power consumption, according to the work-load of the LPAR.

EEA utility 250 comprises code/program instructions that are executed on a processor within a data processing system/CEC 110A to provide specific functions. Among the functionality provided when EEA utility 350 is executed are functions outlined in the following non exclusive list: (a) enabling specification of a minimum energy entitlement and priority of an LPAR within the data processing system; (b) determining whether the LPAR and other LPARs respectively utilize the corresponding minimum energy entitlement based on energy consumption during an execution period; (c) when the LPAR and other LPARs respectively utilize/satisfy the corresponding minimum energy entitlement, determining whether the LPAR has utilized/satisfied a maximum energy requirement; (d) in response to the LPAR not satisfying the maximum energy requirement, allocating unused/available energy entitlement from the data processing system to the LPAR, according to an allocation policy; (e) dynamically adjusting a priority level for the LPAR to efficiently control resource allocation, according to the LPAR's energy consumption relative to its energy entitlement; and (f) transferring unused energy entitlement to other data processing systems requiring further allocation of energy entitlement, according to an inter-CEC allocation policy. The functionality provided when EEA utility 250 is executed, as outlined above, is described in greater detail herein.

Figure 3:
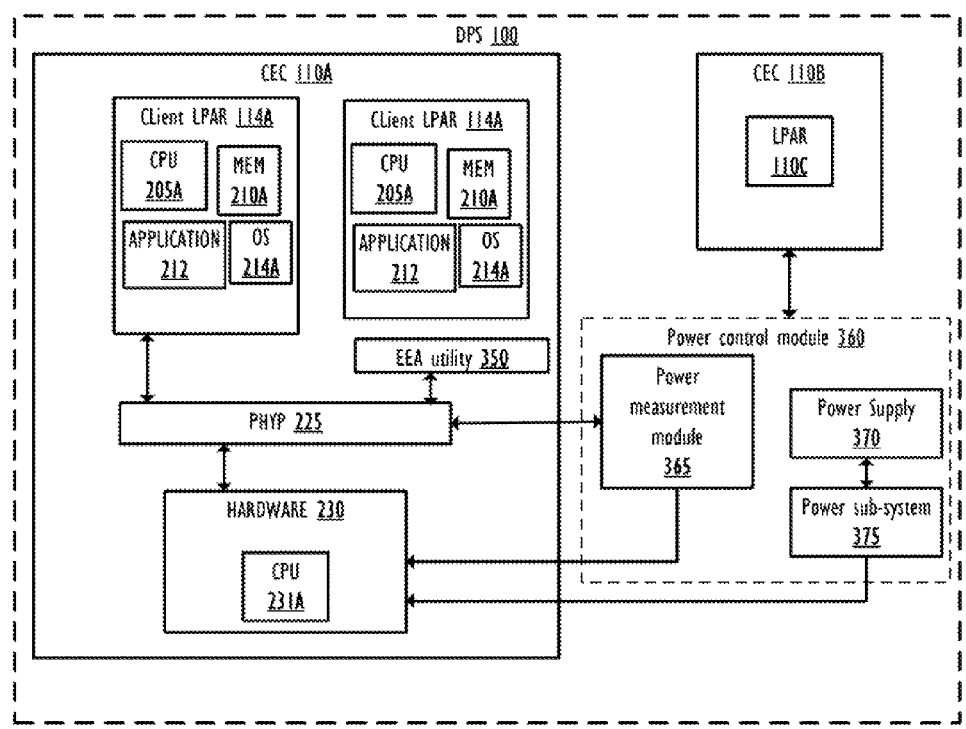
FIG. 3 illustrates a block diagram representation of functional components of a data processing device configured to manage/control the allocation of energy entitlements for one or more executing LPARs, according to one embodiment.

Turning now to FIG. 3, there is illustrated a block diagram representation of functional components of a data processing device configured to provide energy entitlements for one or more executing LPARs, according to one embodiment. Network of data processing systems (DPS) 100 comprises data processing device/computing electronic complex (CEC) 110A. Included in DPS 100 is CEC 110B. Executing within CEC 110A are a plurality of LPARS of which first LPAR 114A and second LPAR 114B are illustrated. EEA utility 350 executes within CEC 110A and utilizes a value for a pre-specified level of energy entitlement assigned to a corresponding LPAR to determine an amount of resources to allocate to the LPAR.

In one embodiment, Power Hypervisor (PHYP) 225 within CEC 110A uses power control module 360 to calculate the energy consumed by each LPAR. Based on an LPAR's energy consumption, EEA utility 250/PHYP 225 allocates entitlements during the hypervisor's scheduling period (i.e., a cyclic interval at which the hypervisor schedules system resources). Included within power control module 360 are power measurement module 365, power sub-system 375 and power supply 370. Power control module 360 is communicatively connected to PHYP 225 and hardware 230. When multiple LPARs are running concurrently, the system's total energy consumption can be divided between the running LPARs. In one embodiment, information about energy consumption of individual memory modules or CPUs is used to attribute consumption to each LPAR.

EEA utility 350 communicates with PHYP 225 and power control module 360 to enforce specified minimum and maximum entitlements (e.g., entitlements 240) of energy consumption within DPS 100. In one embodiment, EEA utility 350 schedules resources for corresponding LPARs by using (system) energy consumption or a combination of energy consumption and other metrics (such as CPU time). One skilled in the art recognizes that CPU time and energy consumption are clearly distinguishable concepts based primarily on the fact that a CPU may consume varying amounts of energy depending on the workloads being executed.

The energy entitlement allocation (EEA) utility enables a system administrator to configure the LPARs of a system by specifying a minimum energy entitlement for each LPAR. In one embodiment, the system administrator performs various functions associated with the different logical partitions via HMC 229. In particular, EEA utility 350 enables the system administrator to trigger (via HMC 229) a reallocation of resources to different logical partitions. Furthermore, the system administrator may choose to specify a maximum energy entitlement and a priority (maintained within priorities 245) of a corresponding LPAR. EEA utility 350 also enables the system administrator to set a maximum total consumption for the corresponding data processing device (e.g., CEC 110A). The hypervisor tracks one or more of the following: (a) the energy consumed by the data processing device; and (b) the energy consumed by individual components (i.e., LPARS) of the data processing device. Based on an awareness by the hypervisor of executing virtual machines and deployed resources, EEA utility 350 uses the (overall) energy consumption that EEA utility 350 tracks via power control module 360 to attribute a particular level of energy consumption to a particular LPAR. EEA utility 350 attributes the energy consumption to an LPAR that was dispatched at a time period during which the overall energy consumption was tracked/recorded. EEA utility 350 compares the level of consumption attributed to the particular LPAR against the pre-specified minimum and maximum energy entitlements. In addition, EEA utility 350 enables PHYP 225 to effectively manage the share of the system resources provided to each LPAR such that all LPARs receive at least the specified minimum entitlements and no more than the specified maximum entitlements. When EEA utility 350 determines that the minimum entitlements are met, EEA utility 350 may allocate additional resources to one or more LPARs that have not yet reached the specified maximum or which have no pre-specified maximum set. EEA utility 350 may allocate additional resources according to the relative priorities of the LPARs within the relevant CEC and the cost per unit of energy that a client associated with an LPAR is willing to pay. Some clients may only wish to expand the relevant systems into available resource space when energy costs are relatively cheap.

EEA utility 350 uses appropriately set maximum limits to ensure that a single workload cannot exceed a predefined maximum limit for energy consumption. If an appropriately set maximum limit is applied to every workload in the data centre, a data centre-wide (overall maximum) consumption limit is also achieved. In addition, an LPAR with no maximum limit is only allowed to consume up to the overall maximum limit set for the data-center as a whole. When data-center/system level energy consumption is relatively low, EEA utility 350 may allow LPARs to run "freely" and consume energy that is not needed by other LPARs (e.g., LPARS that are satisfying maximum energy entitlements) on the system/data-center/CEC 110A. EEA utility 350 may configure some LPARs as lower priority LPARs and others as higher priority LPARS. EEA utility 350 may assign priority to an LPAR based on a scale having two or more discrete (granular) priority levels (e.g., a scale of discrete integer levels from 1 to 10). Some of these LPARs that are pre-configured as lower priority may include LPARs that run batch workloads. EEA utility 350 may configure these lower priority LPARs to run only when energy is cheap or resource/energy contention is low. For example, these lower priority LPARs may only run overnight when other systems are in less demand.

Two key features of the EEA utility are the following: (a) "Intra-CEC allocation" which affects how energy is allocated within a single physical system; and (b) "Inter-CEC collaboration" (also referred to herein as "inter-CEC allocation") which utilizes communication to facilitate sharing of energy entitlement based resources between separate systems.

Intra-CEC Allocation

In one embodiment, EEA utility 350 utilizes a system of dynamic priorities (i.e., dynamically allocated/modified priorities) to allocate energy entitlements, whereby a priority value is associated with each LPAR and maintained and updated/modified by the hypervisor. EEA utility 350 may dynamically allocate priority levels based on current overall consumption/entitlement levels and/or current consumption/entitlement of an individual LPAR relative to consumption/entitlement levels of other LPARS. In one embodiment, EEA utility 350 employs an intra-CEC allocation policy which utilizes an established criteria for allocating (energy entitlement) resources to one or more LPARs executing on a same CEC (e.g., first CEC 110A). In one embodiment, this established criteria is based on one or more of: (a) priority levels of LPARs; and (b) (current) consumption/entitlement levels of LPARs. As an LPAR runs and consumes resources, EEA utility 350 may dynamically lower the priority of the LPAR from a first priority level (e.g., a pre-specified priority value) to a second priority level (i.e., a second pre-specified value or a dynamically determined value), effectively making the chances that the LPAR is immediately scheduled for execution (e.g., based on an allocation of CPU time associated with entitlement) and/or for other additional resources less likely. CPU time is a key resource upon which LPAR execution primarily depends. At the end of a fixed time period or at each dispatch cycle when the LPAR is not running, EEA utility 350 may gradually increase the priority value of the LPAR from a lower priority level to a higher priority level. As a result, EEA utility 350 increases the chances that the LPAR is scheduled for continued execution at a next scheduling period.

EEA utility 350 may enforce minimum and maximum allocations by applying dynamic priority levels to LPARs as these LPARs execute and consume energy. In particular, EEA utility 350 may apply increased/higher priority levels to LPARs with a pre-established minimum entitlement until that minimum entitlement is met. On the other hand, when the maximum allocation is being approached, EEA utility 350 may rapidly/significantly decrease the priority level of the corresponding LPAR. If the administrator has specified that some LPARs are more important than others, EEA utility 350 may further dynamically increase the dynamically determined priority level of the more important LPARs to enable these LPARS to consume more of any additional available resource when all minimum entitlements have been met.

If the physical system also has an overall energy consumption limit, EEA utility 350 uses the hypervisor to enforce these overall consumption limits by allowing the hypervisor to allocate resources to an LPAR(s) executing functions for an "idle" task as EEA utility 350 dynamically increases the priority level of the "idle" task as the system-wide maximum is approached. When scheduled, the idle task (and corresponding LPAR(s)) is responsible for placing system components in the lowest power mode to conserve energy.

Inter-CEC Collaboration

Figure 4:
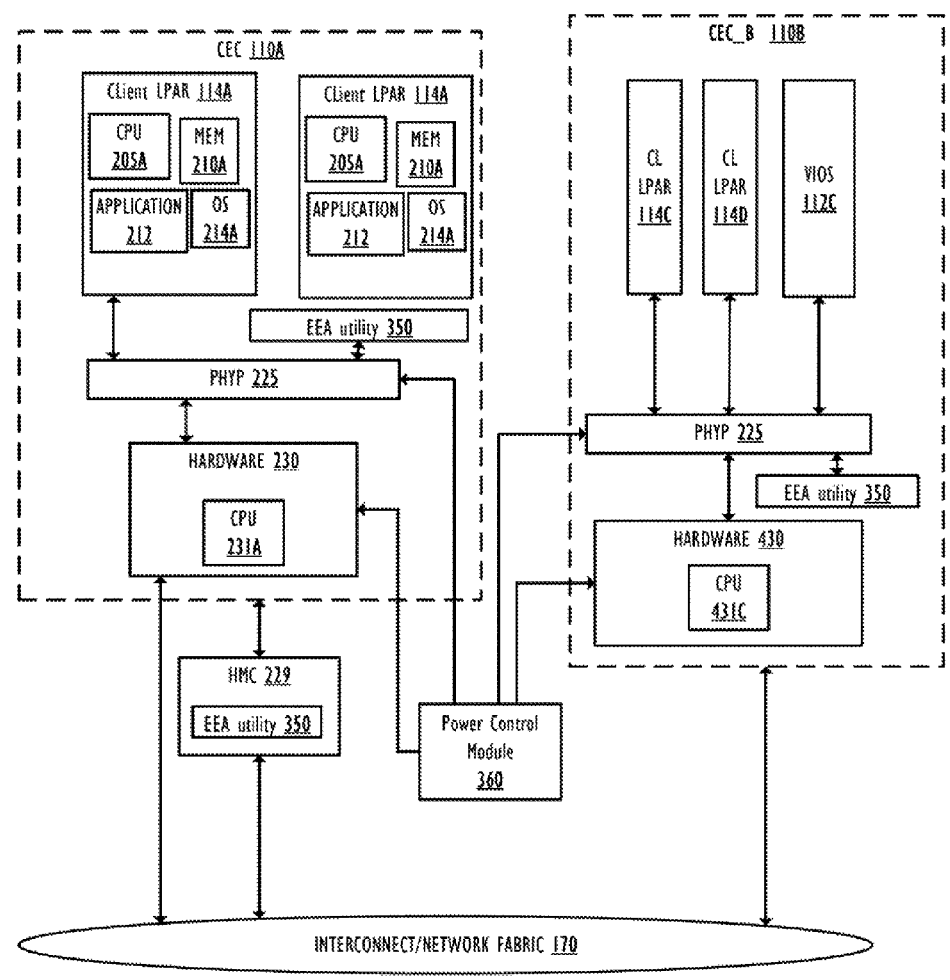
FIG. 4 shows a block diagram representation of functional components of a pair of data processing devices/CECs which CECs are both configured to enable the transfer of energy entitlements from a first CEC to a second CEC, according to one embodiment.

FIG. 4 shows a block diagram representation of functional components of a pair of data processing devices/CECs which CECs are both configured to provide energy entitlements to corresponding LPARs via inter-CEC collaboration, according to one embodiment. Network of data processing systems (DPS) 100 of FIG. 4 is similarly illustrated as DPS 100 of FIG. 3. However, greater detail of second CEC 110B (which substantially mirrors the functional components of CEC 110A) is provided.

When EEA utility 350 determines that the LPARs of a first CEC (e.g., CEC 110A) are not collectively using the full entitlement of energy specified for the CEC and another CEC 110B in the data-centre is using a full allocation, EEA utility 350 is capable of balancing the energy budgets such that energy is allocated where the energy is most needed, while keeping overall energy consumption within the overall limit for the data-centre. In one embodiment, EEA utility 350 is stored within management console 175 or HMC 229 to manage energy entitlement based allocation of resources. In another embodiment, a first instance of the EEA utility is located on a first data processing device and communicates with a second instance of the EEA utility located on a second data processing device to balance energy budgets across data processing devices. As computer systems become more computationally powerful, specified energy entitlements may be significantly less than the amount that a particular computer system is capable of consuming if the computer system is allowed to run unbounded.

If, after a defined period of time, EEA utility 350 determines that the energy consumption of a first CEC has been below a specified limit and none of the corresponding LPARs require additional resources, EEA utility 350 enables the first CEC to donate the remaining/unused energy allocation to other data processing devices (e.g., second CEC 110B). In one embodiment, EEA utility 350 enables a first hypervisor within a first CEC to broadcast the availability of energy to all other data processing devices (e.g., including second CEC 110B) in the data centre over the network. This broadcast communication is sent by the hypervisor, and the broadcast is received by the hypervisor on each other data processing device/system. EEA utility 350 is configured to enable another data processing device to send a request to use the additional resource. EEA utility 350/hypervisor 225 may then choose to allocate/donate the spare energy entitlement to any of the CECs that respond. This inter-CEC allocation decision/policy may be based on the order of the responses received from candidate CECs, or may be based on a more complex criteria. In one embodiment, EEA utility 350 employs an inter-CEC allocation policy (i.e., an allocation policy for inter-CEC collaboration) based on an established criteria for transferring/re-allocating (energy entitlement) resources from a first CEC to one or more LPARs executing on one or a plurality of other CECs (e.g., second CEC 110B). In one embodiment, this established criteria is based on one or more of: (a) priority levels of the LPARs on second CEC 110B; (b) (current) consumption/entitlement levels of these LPARs; and (c) overall consumption demand on one or more of the other CECs. When EEA utility 350 determines which CEC(s) is to be allocated the extra entitlement, EEA utility 350/PHYP 225 simply communicates this information to the one or more CECs over the network. In one implementation, EEA utility 350 further indicates the amount of additional energy that the CEC(s) may consume and for what length of time.

When EEA utility 350 transfers additional energy entitlement from the first CEC to the second CEC, EEA utility 350 uses a lower, dynamically adjusted maximum entitlement (instead of the maximum entitlement specified) for the donor CEC for the corresponding period of time. On the other hand, EEA utility 350B uses a higher, dynamically adjusted maximum entitlement (instead of the maximum entitlement specified) for the receiving CEC. At the end of that time period, EEA utility 350/350B returns the respective energy entitlement values to the normal/pre-specified maximum entitlement value. At this point, EEA utility 350 may provide further donations based on remaining/additional entitlements.

In one embodiment, EEA utility 350/350B enables inter-CEC communication between CECs to facilitate the imposition of a dynamic limit across the data centre. In one implementation, EEA utility 350 employs an additional data processing device/system/module within (or communicatively connected to) the data centre which additional data processing device/module is responsible for receiving frequent updates from the energy supplier, informing of the availability of energy from the supply, and the cost per unit of energy. For example, if fluctuating energy supplies are being used, the cost may increase when energy is relatively scarce (e.g., during periods at which wind turbines are performing below the normal/usual output) or when demand is high elsewhere on the electricity grid. Based on this information that reports cost fluctuations and on some limits/thresholds set by the data center administrator, a corresponding data processing device/system (e.g., CEC 110A) may broadcast to all other data processing devices/systems/CECs to enable these processor systems to increase or reduce their maximum consumption limits. This adjustment of maximum consumption limits allows a corresponding data center to conserve energy much more aggressively when energy is expensive. Furthermore, as a result of the priorities specified between LPARs on a single CEC, the least important workloads are first to be impacted by decreased entitlements, while more important workloads continue to execute.

In one embodiment, EEA utility 350 may utilize a dedicated arbitrator processor system instead of using individual processor systems for broadcasting information to facilitate the imposition of the dynamic limit, depending on the number of processing systems involved in inter-CEC collaboration and the frequency of the associated broadcasts and responses. If all of the CECs in the data centre are considered "trustworthy", the assigning of dynamic entitlement limits may be further enhanced by supplying a priority to each CEC. When energy entitlement is made available for donation, CECs may respond by indicating a respective priority, and the donor CEC may make the donation to the CEC from which the highest priority request was/is received. Similarly, when the data centre limit changes, the CEC priority may be used to influence the reduction or increase in maximum entitlements. For example, the maximum entitlement value may only be reduced for CECs having less than a certain priority threshold. Reducing the maximum entitlement in this manner effectively allows critical workloads to run at full capacity. It is possible that the potential total energy consumption of the hardware in a data centre exceeds the maximum permissible energy usage by the data centre. For example, a data centre may have a set of disk arrays for on-site batch backups that are only activated when the demand for CPU resources is low. CPUs can then be shutdown in order for the disk arrays to be spun up and batch backup workloads activated.

Figure 5:
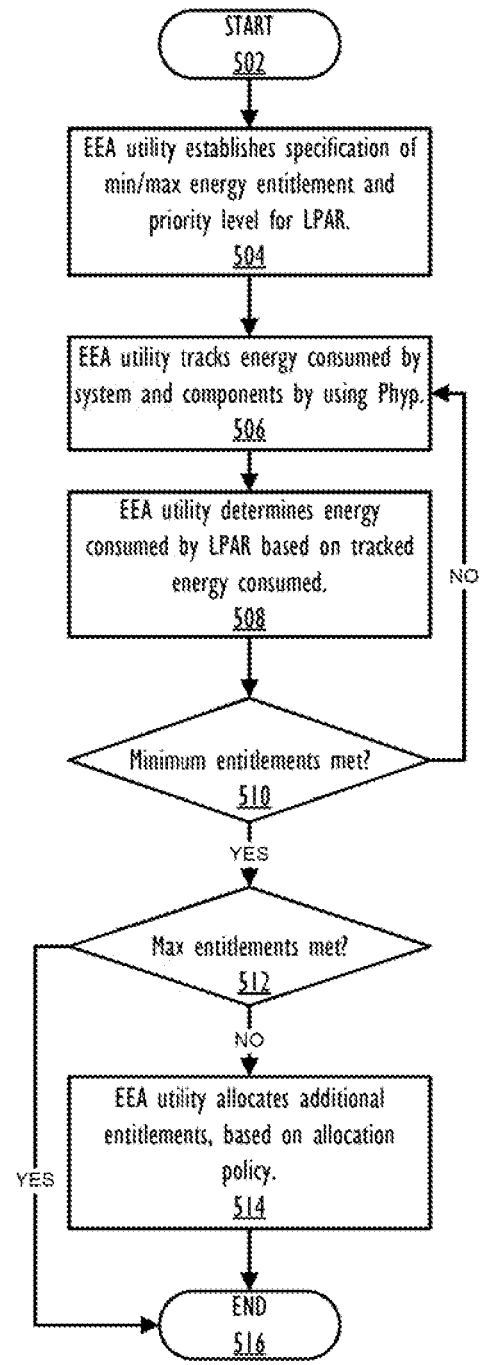
FIG. 5 is a high level logical flowchart of an exemplary method by which a data processing system allocates an energy entitlement to a virtual machine/LPAR based on specified entitlement values, according to one embodiment.
Figure 6:
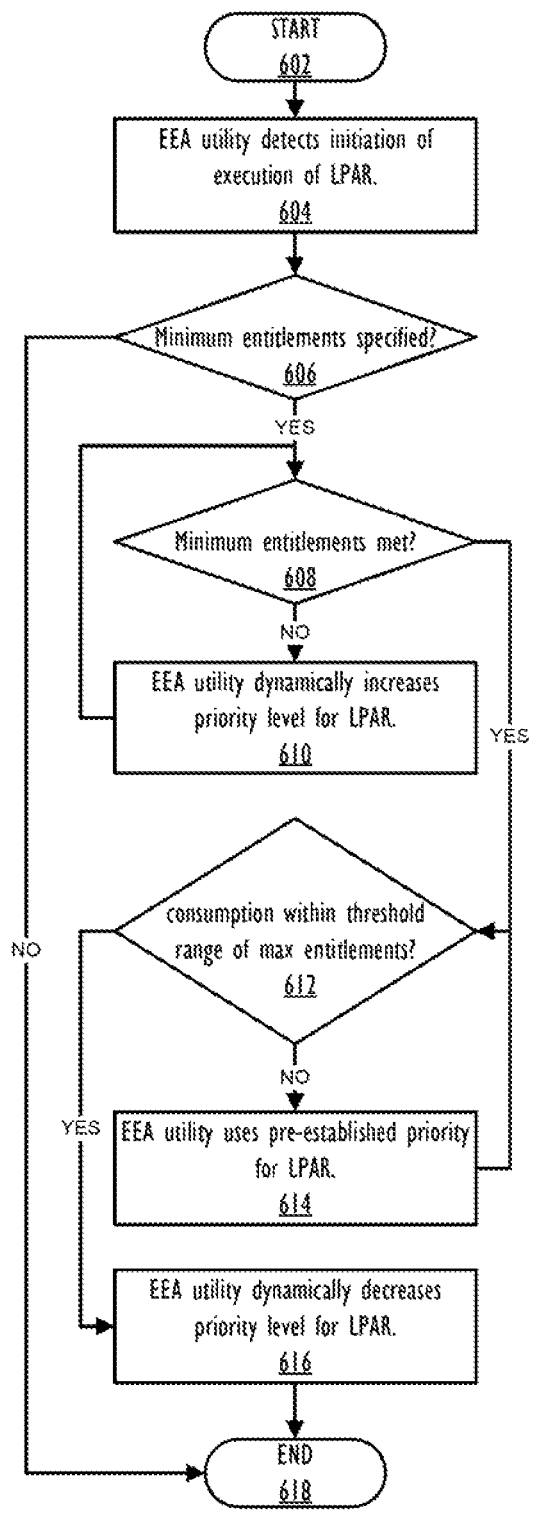
FIG. 6 is a high level logical flowchart of an exemplary method by which a data processing system dynamically adjusts a priority level for the LPAR to efficiently control allocation of energy entitlement, according to one embodiment.
Figure 7:
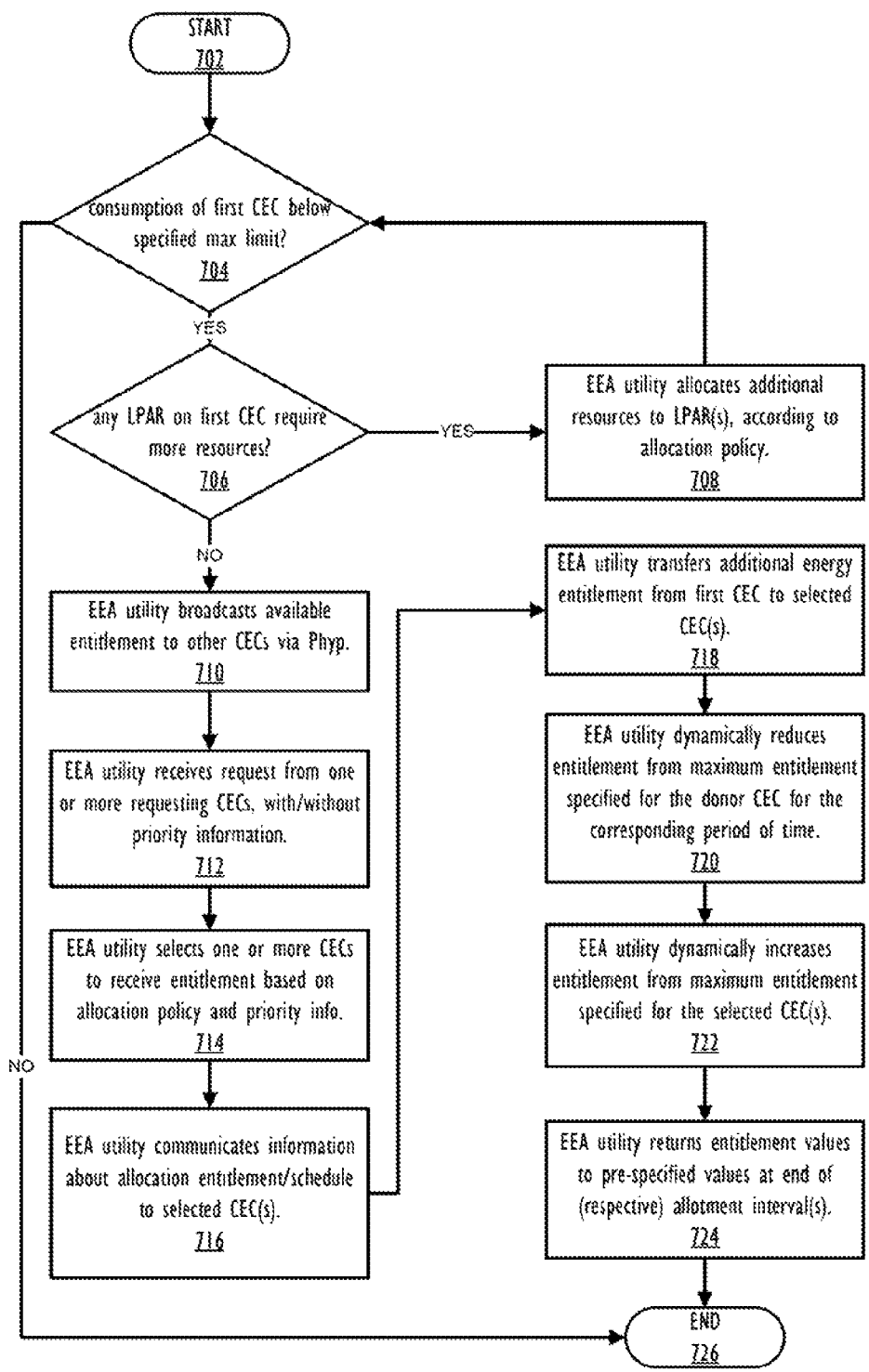
FIG. 7 is a high level logical flowchart of an exemplary method by which a data processing system transfers unused, additional energy entitlement from a first data processing system to another data processing system within a data center, according to one embodiment.

FIGS. 5, 6 and 7 are a flow charts illustrating the methods by which the above processes of the illustrative embodiment are completed. Although the methods illustrated in FIGS. 5-7 may be described with reference to components and functionality illustrated by and described in reference to FIGS. 1-4, it should be understood that this is merely for convenience and alternative components and/or configurations thereof can be employed when implementing the various methods. Certain portions of the methods may be completed by EEA utility 350 executing on one or more processors (CPU 231) within CEC 110A (FIG. 1 or 2) or on processing resources of management tool 180 (within management console 175). The executed processes then control specific operations of or on CECs 110 and client LPARs 114. For simplicity is describing the methods, all method processes are described from the perspective of either/both EEA utility 350 and LPAR 114.

FIG. 5 illustrates the method by which a data processing system such as CEC 110A allocates an energy entitlement to a virtual machine/LPAR based on specified entitlement values, according to one embodiment. The method begins at initiator block 502 and proceeds to block 504 at which EEA utility 350 receives (from an administrator) a specification of minimum energy entitlement and priority of one or more LPARs (which may include a specification of energy entitlement for the overall processing system/CEC). At block 506, EEA utility 350 tracks energy consumed by the overall processing system/CEC and processing system components by using PHYP 225. At block 508, EEA utility 350 determines energy consumed by an individual LPAR based on the tracked energy consumption for the overall processing system and/or processing system components.

At decision block 510, EEA utility 350 determines whether minimum energy entitlements are satisfied. If at decision block 510 EEA utility 350 determines that minimum energy entitlements are not satisfied, the process returns to block 506. If at decision block 510 EEA utility 350 determines that minimum energy entitlements are satisfied, the process moves to decision block 512 at which EEA utility 350 determines whether maximum energy entitlements are satisfied. If at decision block 512 EEA utility 350 determines that maximum energy entitlements are not satisfied, the process moves to block 514 at which EEA utility 350 allocates unused/available energy entitlement to one or more LPARs, according to an allocation policy. The allocation policy is based on one or more of: (a) fulfillment of entitlements by respective LPARS; and (b) priorities of LPARs associated with resource allocation via energy entitlement. If at decision block 512 EEA utility 350 determines that maximum energy entitlements are satisfied, the process moves to block 516 at which block the process ends.

FIG. 6 illustrates the method by which a data processing system dynamically adjusts a priority level for an LPAR to efficiently control allocation of energy entitlement, according to one embodiment. The method begins at initiator block 602 and proceeds to block 604 at which EEA utility 350 detects initiation of execution of an LPAR 114. At decision block 606, EEA utility 350 determines whether minimum energy entitlements are specified for the LPAR. If at decision block 606 EEA utility 350 determines that minimum energy entitlements for that LPAR are specified, the process moves to decision block 608 at which EEA utility 350 determines whether minimum energy entitlements for that LPAR are satisfied. If at decision block 608 EEA utility 350 determines that minimum energy entitlements are not satisfied, the process moves to block 610 at which EEA utility 350 dynamically increases the priority level for the LPAR. If at decision block 608 EEA utility 350 determines that minimum energy entitlements are satisfied, the process moves to decision block 612 at which EEA utility 350 determines whether consumption is within threshold range of the maximum energy entitlement for that LPAR. If at decision block 612 EEA utility 350 determines that consumption is not within threshold range of the maximum energy entitlement, the process moves to block 614 at which EEA utility applies a pre-established priority value for the LPAR. If at decision block 612 EEA utility 350 determines that consumption is within threshold range of the maximum energy entitlement, the process moves to block 616 at which EEA utility 350 dynamically decreases priority level for the LPAR in order to reduce the likelihood of further allocation of resources for the LPAR. The process ends at block 618.

FIG. 7 illustrates the method by which unused, additional energy entitlement is transferred from a first data processing device/system to another data processing device/system within a data center, according to one embodiment. The method begins at initiator block 702 and proceeds to decision block 704 at which EEA utility 350 determines whether power consumption is below a specified maximum limit for a first/local CEC. If at decision block 704 EEA utility 350 determines that consumption is not below the specified limit, the process moves to block 726 at which block the process ends. If at decision block 704 EEA utility 350 determines that consumption is below the specified limit, the process moves to decision block 706 at which EEA utility 350 determines whether any LPAR on the first CEC requires more resources. If at decision block 706 EEA utility 350 determines that no LPAR on the first CEC 110A requires more resources, the process moves to block 710 at which EEA utility 350 broadcasts unused and available entitlement to other CECs via Phyp 225. On the other hand, if EEA utility 350 determines that there is at least one LPAR on the first CEC that requires more resources, the process moves to block 708 at which EEA utility 350 allocates additional resources to the LPAR(s), according to an intra-CEC allocation policy for the first CEC. Following the broadcast notification of available entitlement, EEA utility 350 receives a request for the available resources from one or more other/requesting CECs, as shown at block 712. In one embodiment, EEA utility 350 also receives information (from the requesting/responding LPARs) that indicates a respective priority of responding LPARs. At block 714, EEA utility 350 selects one or more CECs to receive available entitlement based on an allocation policy for inter-CEC collaboration. At block 716, EEA utility 350 indicates selection of one or more CECs to which to allocate available entitlement by communicating information about allocation entitlement/schedule to the one or more selected other CECs. EEA utility 350 transfers additional energy entitlement from first CEC to selected CEC(s), as shown at block 718. At block 720, EEA utility 350 dynamically reduces a first (specified) maximum entitlement for the donor CEC for a period of time. At block 722, EEA utility 350 dynamically increases (via a trigger to EEA utility 350B on a selected CEC) a first (specified) maximum entitlement for the selected/receiving CEC(s). At block 724, EEA utility 350 returns maximum entitlement values to the first (pre-specified) values at the end of an allotment interval(s). The process ends at block 726.

The flowchart and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow chart above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system configured with a plurality of computing electronic complexes (CECs) having one or more processors, one or more memories coupled to the one or more processors, at least one input/output (I/O) adapter that enables connection to an external network, and a virtualization management component executing within the data processing system and which generates a plurality of operating system (OS) partitions and one or more logical partitions (LPARs), a method comprising:

establishing a minimum energy entitlement for an LPAR;

determining at least one of: (a) an amount of energy consumed by the LPAR; and (b) an amount of energy respectively consumed by other LPARs;

determining whether: (a) said amount of energy consumed by the LPAR is adequate to satisfy the minimum energy entitlement; and (b) said amount of energy consumed by the other LPARs respectively satisfy corresponding minimum energy entitlements;

in response to the amount of energy consumed by the LPAR being adequate to satisfy the minimum energy entitlement and the other LPARS having satisfied the respective minimum energy entitlements, determining whether said amount of energy consumed by the LPAR is adequate to satisfy a maximum energy requirement;

in response to the amount of energy consumed by the LPAR not being adequate to satisfy the minimum energy entitlement, allocating an additional energy entitlement to said LPAR, according to an allocation policy;

wherein said allocation policy is based on one or more of: (a) respective energy consumption of LPARS that have not satisfied maximum energy entitlements; and (b) priorities of LPARS whose energy consumption has not satisfied maximum energy entitlements;

determining whether a level of energy consumption of a first CEC is below a specified limit;

broadcasting available entitlement to other CECs via a hypervisor in response to determining that (a) there is no LPAR on the first CEC that requires more resources and (b) that the level of energy consumption of the first CEC is below the specified limit;

receiving a request from one or more requesting CECs, wherein said request provides indication of priority information for a requesting CEC; and selecting one or more requesting CECs to receive further entitlement based on an allocation policy for inter-CEC collaboration.

2. The method of claim 1, wherein said establishing further comprises:
specifying one or more of: (a) a maximum energy entitlement for the LPAR; (b) a priority level for the LPAR; and (c) a maximum total consumption for the data processing system; and allocating system resources according to specified energy entitlements;
wherein said system resources include CPU time.

3. The method of claim 1, further comprising:
dynamically adjusting a priority level for the LPAR to efficiently control resource allocation, according to a current entitlement of the LPAR and energy that has been consumed by the LPAR;
wherein said LPAR is more likely to be allocated resources if the priority level is dynamically increased;
wherein said LPAR is less likely to be allocated resources if the priority level is dynamically decreased.

4. The method of claim 1, wherein said determining an amount of energy consumed further comprises:
tracking via a hypervisor a level of energy consumed by one or more of: (a) the data processing system; and (b) individual components of the system including processor and memory resources; and
attributing an amount of energy consumed to the LPAR based on said level of energy consumed;
wherein said LPAR executes in a time period during which said level of energy consumed by components of said data processing system is tracked.

5. The method of claim 1, further comprising:
transferring unused, additional energy entitlement from the first CEC to one or more selected other CECs, according to an allocation policy.

6. The method of claim 5, further comprising:
determining whether any LPAR on a first CEC requires more resources, wherein no energy entitlement is transferred from the first CEC when there are LPARs on the first CEC that require more energy resources.

7. The method of claim 1, further comprising:
in response to the one or more CECs being selected to receive further entitlement:
dynamically reducing entitlement from a maximum entitlement specified for the donor CEC;
dynamically increasing entitlement from maximum entitlement specified for the selected CEC(s); and
returning entitlement values to pre-specified values at an end of a respective allotment interval.

* * * * *